US012459372B2

(12) United States Patent
Gompper

(10) Patent No.: US 12,459,372 B2
(45) Date of Patent: Nov. 4, 2025

(54) VIBRATION CANCELLATION VIA ELECTRIC MOTOR TORQUE CONTROL FOR A VEHICLE

(71) Applicant: Ford Global Technologies, LLC, Dearborn, MI (US)

(72) Inventor: Daniel B. Gompper, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 115 days.

(21) Appl. No.: 18/581,038

(22) Filed: Feb. 19, 2024

(65) Prior Publication Data

US 2025/0262945 A1 Aug. 21, 2025

(51) Int. Cl.
*B60L 15/20* (2006.01)
*B60K 7/00* (2006.01)

(52) U.S. Cl.
CPC ............ *B60L 15/20* (2013.01); *B60K 7/0007* (2013.01); *B60K 2007/0092* (2013.01); *B60L 2240/22* (2013.01); *B60L 2240/423* (2013.01)

(58) Field of Classification Search
CPC ............... B60L 15/20; B60L 2240/22; B60L 2240/423; B60K 7/0007; B60K 2007/0092
See application file for complete search history.

(56) References Cited

U.S. PATENT DOCUMENTS

| 7,110,867 | B2 | 9/2006 | Imazu | |
|---|---|---|---|---|
| 8,892,281 | B2 * | 11/2014 | Suzuki | B60L 15/20 318/432 |
| 9,604,623 | B2 | 3/2017 | Ide | |
| 2015/0251649 | A1 | 9/2015 | Liang et al. | |
| 2020/0088281 | A1 | 3/2020 | Chen et al. | |
| 2021/0309206 | A1 | 10/2021 | Mizuguchi et al. | |
| 2022/0395861 | A1 * | 12/2022 | Snow | B06B 1/166 |

FOREIGN PATENT DOCUMENTS

JP 2017011945 A 1/2017

OTHER PUBLICATIONS

E. Ayana, et al. "Active Torque Cancellation for Transmitted Vibration Reduction of Low Cylinder Count Engines," in IEEE Transactions on Vehicular Technology, vol. 60, No. 7, pp. 2971-2977, Sep. 2011, doi: 10.1109/TVT.2011.2159255. keywords: {Engines; Torque; Vibrations (Year: 2011).*

* cited by examiner

*Primary Examiner* — Gertrude Arthur Jeanglaude
(74) *Attorney, Agent, or Firm* — Burr & Forman; Lorne Forsythe

(57) ABSTRACT

A vehicle control system for a vehicle may include an electric motor to generate a drive torque for propulsion of the vehicle, a sensor network operably coupled to suspension or propulsion system components of the vehicle to determine information indicative of vehicle status, a torque control module configured to generate the drive torque based at least in part on information indicative of operational intent, and a controller operably coupled to the sensor network to determine force application reference axis vibration based on the information indicative of vehicle status to generate a cancellation signal for provision to the torque control module. The torque control module torque may modulate the drive torque based on the cancellation signal to cancel the force application reference axis vibration.

20 Claims, 5 Drawing Sheets

VIBRATION CANCELLATION VIA ELECTRIC MOTOR TORQUE CONTROL FOR A VEHICLE

TECHNICAL FIELD

Example embodiments generally relate to vehicle control algorithms and, more particularly, relate to a vibration cancellation feature that employs electric motor torque and/or speed control to implement such cancellation.

BACKGROUND

Vehicles demonstrate many rigid body vibrational modes, as well as structural modes. When the vehicle is excited by bumps in the road surface or otherwise, these vibrational modes are excited as well, and lead to tactile vibration that can be perceived by the driver and passengers of the vehicle. A significant amount of engineering work is put into designing structural elements (e.g., vehicle suspension components) to minimize the amplitude of these vibrational responses in an effort to enhance driving comfort.

For some tactile vibrational modes, electric vehicle powertrain motion may be involved in the vibrational response. For example, solid axle suspensions (Hotchkiss suspensions among others) will have a vibrational mode that involves the pitch of the axle. In an electric axle drive (e.g., eAxle) version of this same suspension, the electric powertrain (e.g., of the eAxle) will move with the pitch of the axle and will experience higher pitch inertia than equivalently capable conventional axles. As such, the suspension may have lower pitch frequencies and higher amplitudes of axle pitch response. In turn, the vehicle may be exposed to higher shake and vibration, which may reduce driving comfort.

Thus, it may be desirable to develop a strategy for reducing tactile vibrational modes without adding additional suspension components.

BRIEF SUMMARY OF SOME EXAMPLES

In accordance with an example embodiment, a vehicle control system for a vehicle may be provided. The vehicle control system may include an electric motor to generate a drive torque for propulsion of the vehicle, a sensor network operably coupled to suspension or propulsion system components of the vehicle to determine information indicative of vehicle status, a torque control module configured to generate the drive torque based at least in part on information indicative of operational intent, and a controller operably coupled to the sensor network to determine force application reference axis vibration based on the information indicative of vehicle status to generate a cancellation signal for provision to the torque control module. The torque control module torque may modulate the drive torque based on the cancellation signal to cancel the force application reference axis vibration.

In another example embodiment, a method of employing motor control to reduce vibration felt by an operator of a vehicle with an electric motor for generating drive torque for propulsion of the vehicle may be provided. The method may include receiving information indicative of vehicle status from a sensor network operably coupled to suspension or propulsion system components of the vehicle, receiving information indicative of operational intent from the operator, determining force application reference axis vibration based on the information indicative of vehicle status, determining a cancellation signal for provision to the torque control module based on the force application reference axis vibration, and performing torque modulation with respect to the drive torque based on the cancellation signal to cancel the force application reference axis vibration.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
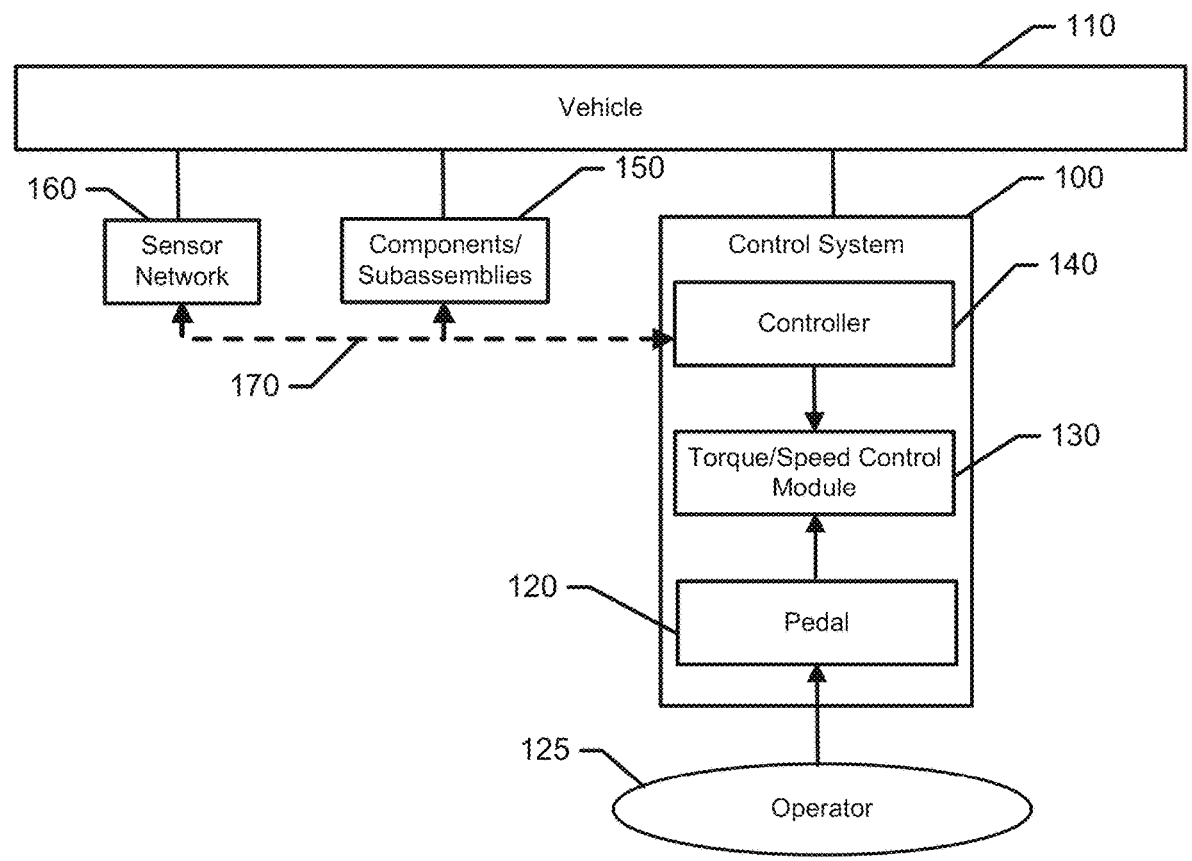
FIG. 1 illustrates a block diagram of a vehicle control system in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

As noted above, the powertrain of an electric vehicle (EV) may contribute to vibrational modes. In order to cancel or otherwise mitigate or reduce such vibration, a cancellation technique may be applied, which may be similar in concept to active noise cancellation. In this regard, for example, for vibrational modes that involve motion of the EV powertrain around its primary rotational axis an electrical signal may be provided to intentionally induce a vibration at the proper frequency and phase to cancel the active vehicle vibration response being excited from the road surface or other source. Thus, for example, a cancellation torque may be generated for the electric motor that may cancel out pitch vibration that is otherwise inherent with any pitch mode.

When, for example, an eAxle structure is employed where the primary axis of the motor is in line with the axle tube of the vehicle and in rotation, the motion that may be generated may be global pitch, and therefore unwanted vibration about the primary axis would be pitch vibration. If instead, the eAxle is mounted such that the motor replaces the driveshaft input into a differential, then the primary axis of the motor is longitudinal and in rotation. The motion that may be generated may be global roll, and vibrations to this motion may be roll vibration. Global pitch may also be invoked in cases where independent suspensions are aligned in an east/west (e.g., side to side) alignment. Global roll may also be invoked in cases where independent suspensions are aligned in a north/south (e.g., front to back) alignment. Combinations of these features may complicate the vibrational components that may be introduced (and need cancellation). Moreover, the motor could effectively be operably coupled to the chassis to introduce any number of different axes of rotation, or combinations of axes of rotation. Thus, the vibration cancellation that is desired may effectively be considered to be vibration about any force (e.g., for torque or speed modification) application reference axis. An example will be described below, in detail, in reference to pitch vibration. However, it should be understood that pitch vibration is just one form of force application reference axis vibration (i.e., vibration about a given force application reference axis, which may be a single axis or a combination of components introduced about multiple axes). Example embodiments may be applied with respect to vibrations about any reference axis.

Additionally, it should be noted that, from a modal analysis perspective, a structure or vehicle's modal response is determined by the structure's mass/inertia and the compliances between those masses/inertias. The control system has the ability to connect/reconnect the motor's stator and armature (fixed vs moving parts) as necessary, actively managing the effective compliance between the stator and armature, changing the vibrational response sensitivity (normal modes) as well as the vibration response motion (mode shapes). Recognizing this, the control system could manage the torque/speed control such that the motor windings act as a spring and to change the spring effectively from fully "free" or fully "fully locked" or anywhere in between to best manage the vibrational response.

Within this context, the electric signal used to generate the cancellation torque (e.g., a cancellation signal) may be provided as an overlay to the lower frequency associated with drive torques that are otherwise being generated. The provision of the cancellation signal as an overlay may therefore not affect the normal performance of the EV powertrain. In the context of an eAxle, to identify a pitch response, torque fluctuation in the motor at the frequency of interest may be used or alternatively, independent displacement or acceleration transducers may be employed. For other EV powertrains, existing or additional sensors may be used to observe vibration to determine the appropriate cancellation signal to be applied. As such, some example embodiments may provide an improved system for vehicle control that can yield benefits in both customer comfort and satisfaction.

FIG. 1 illustrates a block diagram of a control system 100 of an example embodiment. The components of the control system 100 may be incorporated into a vehicle 110 (e.g., via being operably coupled to a chassis of the vehicle 110, various components of the vehicle 110 and/or electronic control systems of the vehicle 110). Of note, although the components of FIG. 1 may be operably coupled to the vehicle 110, it should be appreciated that such connection may be either direct or indirect. Moreover, some of the components of the control system 100 may be connected to the vehicle 110 via intermediate connections to other components either of the chassis or of other electronic and/or mechanical systems or components.

The control system 100 may include an input device in the form of a control pedal (or simply a pedal 120). The pedal 120 may be similar to a conventional brake pedal or gas pedal pivotally mounted to the floor of the vehicle 110 in some cases. However, the pedal 120 could alternatively be hand operated, a single dedicated foot operated pedal, or any other operable member via which an operator 125 may provide an input indicative of an intent of the operator relative to controlling net torque for application to the wheels of the vehicle 110.

The control system 100 may also include a torque control module 130 (or torque/speed control module), which may be part of or otherwise operably coupled to a controller 140. The torque control module 130 may be configured to determine net torque as described herein based on inputs from any or all of the controller 140, the pedal 120 or other components of the vehicle 110 for torque and/or speed control. In some cases, the controller 140 may be part of an electronic control system of the vehicle 110 that is configured to perform other tasks related or not related to propulsive and braking control or performance management. However, the controller 140 could be a dedicated or standalone controller in some cases.

In an example embodiment, the controller 140 may receive information that is used to determine vehicle status from various components or subassemblies 150 of the vehicle 100. Additionally or alternatively, various sensors that may be operably coupled to the components or subassemblies 150 may be included, and may provide input to the controller 140 that is used in determining vehicle status. Such sensors may be part of a sensor network 160 and sensors of the sensor network 160 may be operably coupled to the controller 140 (and/or the components or subassemblies 150) via a vehicle communication bus (e.g., a controller area network (CAN) bus) 170.

The components or subassemblies 150 may include, for example, a brake assembly, a propulsion system and/or a wheel assembly of the vehicle 110. The brake assembly may be configured to provide braking inputs to braking components of the vehicle 110 (e.g., friction brakes and electrical methods of braking such as regenerative braking) based on a braking torque determined by the controller 140 and/or torque control module 130. The propulsion system may include an electric motor (e.g., a battery or generator powered, electric drive motor). The controller 140 and/or torque control module 130 may be configured to determine propulsive torque inputs for provision to the propulsion system to apply propulsive torque to the wheels of the wheel assembly of the vehicle 110 via the electric motor. Moreover, one or more corresponding sensors of the sensor network 160 that may be operably coupled to the brake assembly and/or the wheel assembly may provide information relating to brake torque, brake torque rate, vehicle velocity, vehicle acceleration, front/rear wheel speeds, vehicle pitch, etc. Other examples of the components or subassemblies 150 and/or corresponding sensors of the sensor network 160 may provide information relating to yaw, lateral G force, throttle position, selector button positions associated with chassis and/or vehicle control selections, etc.

Accordingly, for example, the controller 140 may be able to receive numerous different parameters, indications and other information that may be related to or indicative of different situations or conditions associated with vehicle status. The controller 140 may also receive information indicative of the intent of the operator 125 relative to control of various aspects of operation of the vehicle 110 and then be configured to use the information received in association with the execution of one or more control algorithms that may be used to provide instructions to the torque control module 130 in order to control application of net torque to the wheels of the wheel assembly of the vehicle 110.

As will be discussed in greater detail below, the controller 140 may receive input from the sensor network 160 that is indicative of a pitch vibration being experienced by the vehicle 110. The controller 140 may use this received input including information indicative of the pitch vibration to determine a cancellation signal to apply to the torque control module 130. The cancellation signal may be determined based on the pitch vibration, and may be calculated in terms of frequency and phase that may be generated to cancel the pitch vibration (partially or fully) to improve ride quality. The cancellation signal may be an overlay signal provided to the torque control module 130 along with normal control signals otherwise used by the torque control module to generate drive torque that may be applied to the electric motor of the propulsion system.

Figure 2:
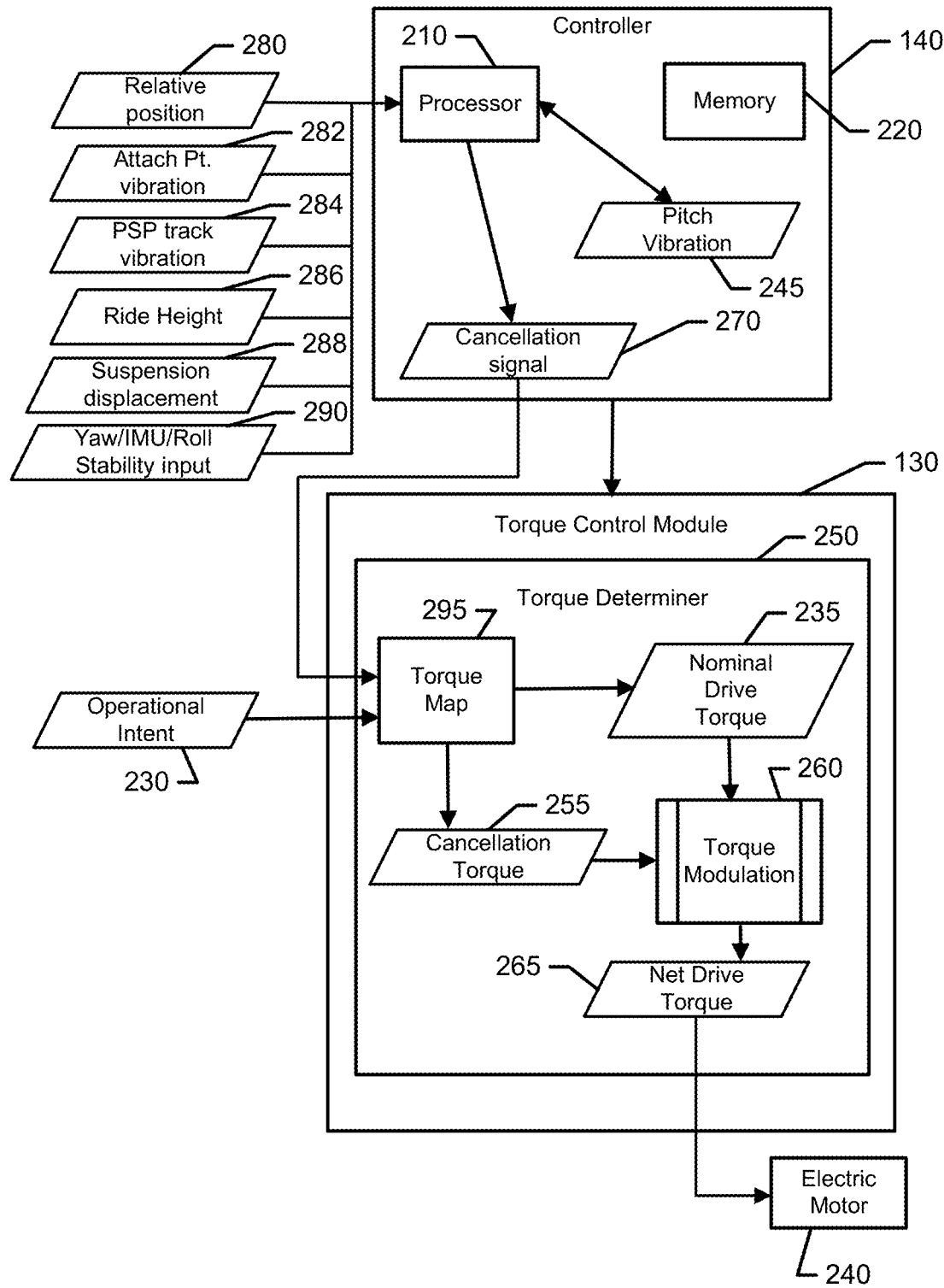
FIG. 2 illustrates a block diagram of some components of the vehicle control system of FIG. 1 in accordance with an example embodiment.

FIG. 2 illustrates a block diagram of various components of the control system 100 in greater detail. In this regard, for example, FIG. 2 illustrates example interactions between the controller 140 and the torque control module 130 relative to information received thereby (e.g., from the sensor network 160, from various ones of the components/subassemblies 150, and/or from the operator 125). Processing circuitry (e.g., a processor 210 and memory 220) at the controller 140 may process the information received by running one or more control algorithms. The control algorithms may include instructions that can be stored by the memory 220 for retrieval and execution by the processor 210. In some cases, the memory 220 may further store one or more tables (e.g., look up tables) and various calculations and/or applications may be executed using information in the tables and/or the information as described herein.

The processor 210 may be configured to execute the control algorithms in series or in parallel. However, in an example embodiment, the processor 210 may be configured to execute multiple control algorithms in parallel (e.g., simultaneously) and substantially in real time. The control algorithms may be configured to perform various calculations based on the information received regarding specific conditions of vehicle components for ultimate use by the torque control module 130. The control algorithms may therefore execute various functions based on the information received, and generate outputs to drive the control of net torque applied at the wheels of the vehicle 110. The torque control module 130 may itself be a control algorithm, or may include control algorithms in the form of functional modules (or sub-modules) configured to perform specific functions for which they are configured relating to control of the vehicle 110 in the manner described herein.

In an example embodiment, the information upon which the control algorithms operate may include pedal position (e.g., a position of the pedal 120 of FIG. 1) or other information indicative of operational intent 230 of the operator 125 with respect to speed, directional control or other controllable aspects of vehicle operation. In some cases, the information indicative of operational intent 230 may be used by the torque control module 130 to generate a nominal drive torque request 235. In an example embodiment, the nominal drive torque request 235 may be propulsive torque value or a net torque value accounting for both propulsive and braking torque that is to be applied at any given time. The torque value generated by the torque control module 130 may be provided to an electric motor 240.

As noted above, the electric motor 240 may, in some cases, contribute to vibrational modes that involve motion of the EV powertrain around its primary rotational axis (e.g., pitch vibration 245 as one example of force application reference axis vibration). In an example embodiment, the torque control module 130 may include a torque determiner 250 that may contribute to efforts to cancel the pitch vibration 245. In some cases, the torque determiner 250 may be a module or portion of the torque control module 130 and therefore may also be controlled in operation by the controller 140. Moreover, in some cases, the torque determiner 250 may be embodied as a functional control algorithm executed by the controller 140.

Regardless of form, the torque determiner 250 may be configured to receive the information indicative of operational intent 230 and generate nominal drive torque request 235, but also generate a cancellation torque request 255 that may be used along with the nominal drive torque request 235 via torque modulation 260 to generate a net drive torque request 265 that is used to drive the electric motor 240. The cancellation torque request 255 may be determined based on a cancellation signal 270, which may be determined by the controller 140 based on vehicle status information that is received by the controller 140 from the sensor network 160. In this regard, in an example embodiment, the vehicle status information may be used by the controller 140 to determine pitch vibration 245 (e.g., in terms of frequency and phase) and then the controller 140 may determine the cancellation signal 270 as the corresponding frequency and phase needed to be applied in order to cancel out the pitch vibration 245.

The vehicle status information that is used to determine pitch vibration 245 may be from any suitable source. In some cases, the pitch vibration 245 may be determined by first measuring vehicle pitch, and then determining high frequency variations to the vehicle pitch. Vehicle pitch may be calculated or otherwise provided based on one or more accelerometers located in the vehicle 110 (e.g., along a longitudinal centerline of the vehicle 110) and/or based on wheel speed information. However, any suitable way of measuring vehicle pitch 234 in terms of an angle of the longitudinal centerline of the vehicle 110 relative to a flat ground reference may alternatively be employed. Some examples of information that may be useful to determine pitch vibration 245 are shown in FIG. 2. In this regard, for example, the pitch vibration 245 may be determined based on calculations that are performed based on torque (e.g., a backward calculation from torque-based measurements associated with system components. One such example is the use of relative position 280 between motor and axle components. In particular, for example, an angular difference between the electric motor 240 and the axle may be indicative of the relative position 280.

Besides calculation, direct measurements may be used to determine pitch vibration 245 in some cases. In this regard, for example, measuring attachment point vibration 282 at attachment points between suspension components and the chassis (e.g., body, frame, etc.) of the vehicle 110 may be used. Passenger support platform (PSP) track vibration 284 (e.g., of the track for adjusting position of the bench or chair-like support for passengers) may be another directly measurable value that may be used to determine pitch vibration 245. Ride height 286 measured from ride height sensors may also be useful in certain cases, along with suspension displacement 288, which may be measured as the displacement along an axis of springs, shocks, dampers or other shock absorbers. Many other parameters may also be employed for determining pitch vibration 245 including yaw, inertial measurement unit (IMU), roll stability and other measured inputs 290. The cancellation signal 270 may therefore be generated once the pitch vibration 245 has been determined, and the cancellation signal 270 may be an electrical signal provided to intentionally induce a vibration via the electric motor 240 at the proper frequency and phase to cancel the pitch vibration 245 as noted above.

Although the torque determiner 250 may determine the nominal drive torque request 235 and/or the cancellation torque request 255 in any suitable way, FIG. 2 illustrates one example of how such determinations may be made. In this regard, one or both of the nominal drive torque request 235 and the cancellation torque request 255 may be determined from the information indicative of operational intent 230 and the cancellation signal 270, respectively, using a torque map 295. If employed, the torque map 295 may, for example, be constructed to balance the information indicative of vehicle status with the information indicative of operational intent 230 in order to infer a torque value that is to be generated by the electric motor 240. In an example embodiment, the torque map 295 may include a base map that maps input values (e.g., pedal position and vehicle speed for the nominal drive torque request 235 and the frequency and phase of the cancellation signal 270) to corresponding output torque values. This base map may then be adjusted based on other factors. If employed, the torque map 295 may be generated or otherwise provided by the manufacturer. The torque map 295 may be generated based on test data gathered over many hours of testing in numerous different conditions and situations. However, the torque control module 130 of some example embodiments may further be configured to employ machine learning techniques to adjust the torque map 295 during operation. The torque map 295 may therefore be dynamically adjusted automatically by the torque control module 130 over time based on updated operational information. Moreover, the torque map 295 may be calibrated (e.g., wirelessly or via wired connection to a diagnostic system) over time based on manufacturer updated information during routine maintenance, or upon request of the operator 125 for such updates. The calibration may involve receipt of performance data from multiple vehicles and analysis of such data to then provide calibrations or other dynamic adjustments that may benefit an entire fleet or population of vehicles that include the torque control module 130 of example embodiments.

Figure 3:
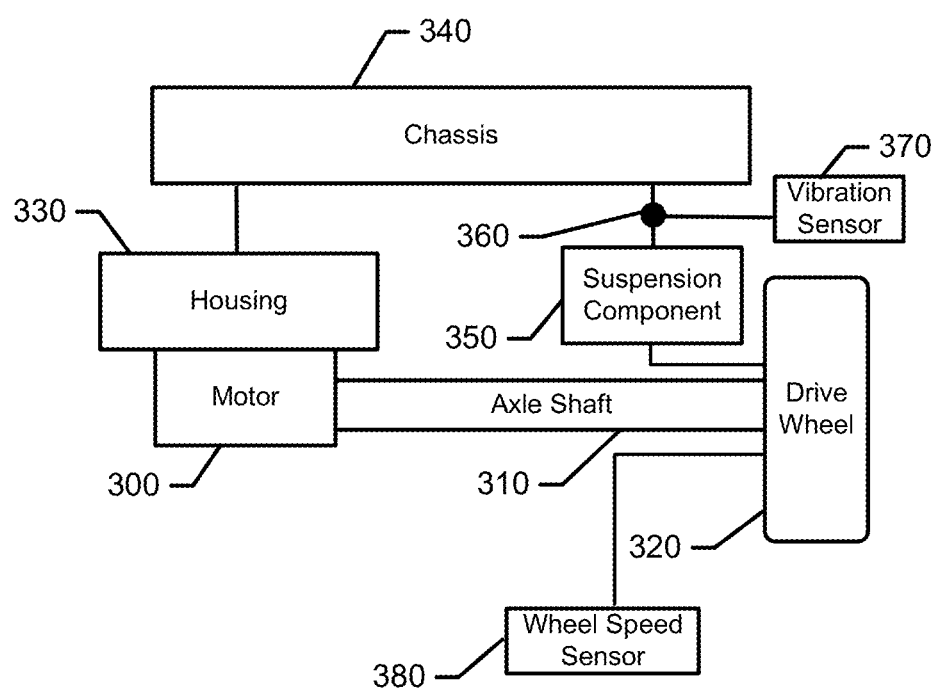
FIG. 3 illustrates a block diagram of a vehicle architecture in which an electric motor is part of the axle and can have force application reference axis vibration cancellation performed in accordance with an example embodiment.

Example embodiments may apply differently when applied to corresponding different operational contexts. In this regard, for example, dependent upon where or how the electric motor 240 is mounted, the electric motor 240 may essentially be part of the suspension system of the vehicle 110. For example, if the electric motor 240 is mounted such that it is essentially a part of an axle or axle shaft of the vehicle, this paradigm exists. FIG. 3 illustrates such an example. In such an example either calculated or measured torque values, either directly measured via transducers or other sensors, or calculated from other reference locations that can be known or measured, may be used to determine cancellation torque 255.

Turning to FIG. 3, a motor 300 (an example of electric motor 240) may be mounted in an eAxle configuration. In such a configuration, the motor 300 is part of the axle or axle shaft 310 that is in turn operably coupled to a drive wheel 320 of the vehicle 110. In this case, a housing 330 of the motor 300 is mounted to (or otherwise operably coupled to) a chassis 340 (e.g., body or frame of any type or structure) of the vehicle 110, whereas a shaft of the motor 300 is connected to (or otherwise operably coupled to) the axle shaft 310. As noted above, for this structure, the relative position 280 between the axle shaft 310 and the motor 300 may determine an angle that can be used to determine pitch angle, and ultimately pitch vibration 245 based on high frequency changes thereto. FIG. 3 also illustrates a suspension component 350 (e.g., a shock absorber) that is attached to the chassis 340 at an attachment point 360. A vibration sensor 370 (e.g., an accelerometer or other sensor) may be located at or proximate to the attachment point 360 to measure vibration that may be used to determine the pitch vibration 245. A wheel speed sensor 380 may also or alternatively be employed to sense vibration for determining the pitch vibration 245 in some cases.

Notably, the attachment point 360 between the suspension component 350 and the chassis 340 may differ across different types of suspension. However, the principle does not change and therefore example embodiments can be performed for any suspension type. Thus, for example, for multi-link suspension solutions, leaf spring suspension, shocks, springs, dampers, etc., of all types, vibration sensors, transducers, and/or the like may be located proximate to the attachment points 360 to obtain vibration data for determining the pitch vibration 245.

Figure 4:
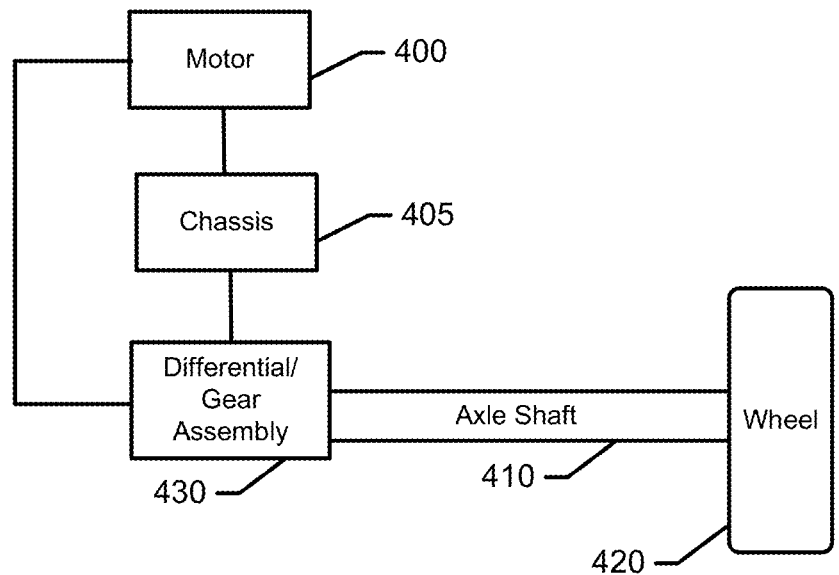
FIG. 4 illustrates a block diagram of a vehicle architecture in which an electric motor is not part of the axle and can have force application reference axis vibration cancellation performed in accordance with an example embodiment.
Figure 5:
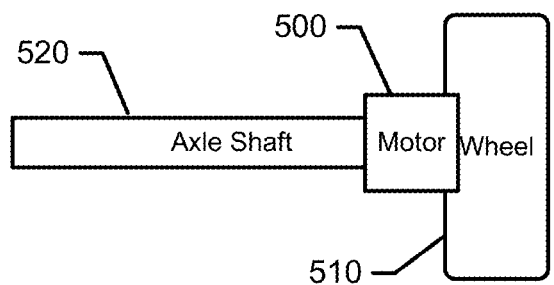
FIG. 5 illustrates a block diagram of a vehicle architecture in which an electric motor is an in-wheel motor and can have force application reference axis vibration cancellation performed in accordance with an example embodiment.

Alternative structures may be employed in which the electric motor 240 is not essentially part of the suspension system, and the cancellation strategies discussed above may still be employed. In this regard, for example, as shown in FIG. 4, an alternative structure may include a motor 400 (e.g., another example of the electric motor 240) that is operably coupled (e.g., via chassis 405) to an axle shaft 410 that is in turn operably coupled to a drive wheel 420. Notably, the suspension system employed may be either a solid axle type suspension or an independent suspension, or any other suspension type. In this example, instead of being a part of the axle shaft 410, the motor 400 is mounted apart from the axle shaft 410, and is operably coupled to the axle shaft 410 via a differential or a gear assembly 430. FIG. 5 illustrates still another example, where a motor 500 is located at a drive wheel 510, and therefore not at the opposite end (or distal end) of the axle shaft 520 relative to the drive wheel 510. In either case, cancellation torque may still be applied, buy may have different values.

Moreover, it should also be appreciated that it may be possible in some cases that an electric motor may be added to the vehicle structure at some other location and position for the sole purpose of providing cancellation for pitch vibration 245 (e.g., at tactile frequencies employing active cancellation). In such cases, the cancellation torque values calculated for provision to the electric motor may not directly offset the drive torque, but may be applied at whatever location is chosen with mathematical modification sufficient to account for the fact that the axis of the pitch vibration 245 may be offset from the location of the electric motor providing cancellation.

As noted above, the control algorithms described above (and potentially others as well) may be executed in parallel and in real time by the controller 140. The execution of the control algorithms in parallel with each other may result in multiple potentially different directions (i.e., increasing/decreasing) and magnitudes of torque requests. Accordingly, the torque requests may combine to define a net torque value that dictates how the vehicle 110 operates at each instant in time. Thus, for example, the cancellation torque request 255 and the nominal drive torque request 235 may each have positive components (requests for positive propulsive torque) and negative components (requests for negative or braking torque). Accordingly, the torque modulated result in the form of the net drive torque 265 may also potentially have positive or negative components that ultimately drive the electric motor 240 in a way that can potentially offset some of the pitch vibration 245 that is being detected, and therefore result in a more comfortable ride for passengers. Moreover, this can be done without adding additional suspension components, and therefore may improve quality and efficiency simultaneously.

Figure 6:
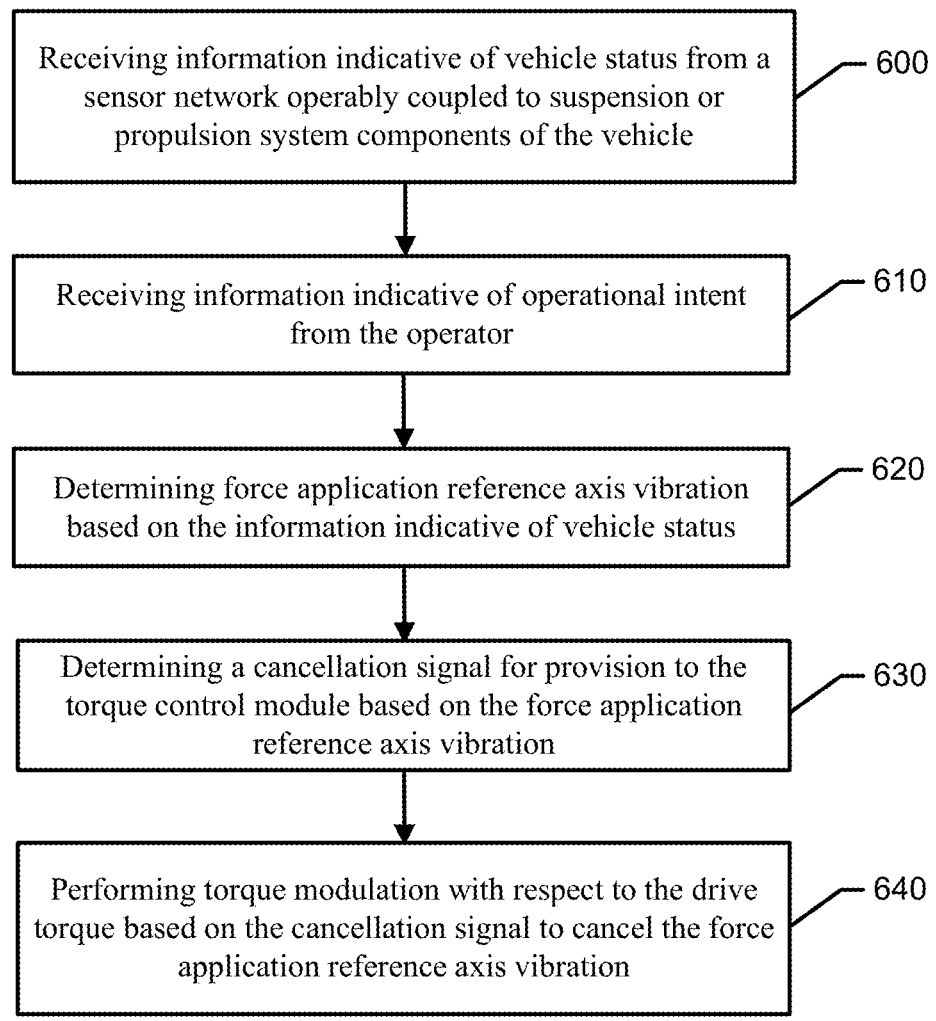
FIG. 6 illustrates a method of canceling force application reference axis vibration in a vehicle in accordance with an example embodiment.

FIG. 6 illustrates a block diagram of one example method of employing motor control to reduce vibration felt by an operator of a vehicle with an electric motor for generating drive torque for propulsion of the vehicle may be provided. The method may be executed by the controller 140 of an example embodiment. In this regard, as shown in FIG. 6, the method may include receiving information indicative of vehicle status from a sensor network operably coupled to suspension or propulsion system components of the vehicle at operation 600 and receiving information indicative of operational intent from the operator at operation 610. The method may also include determining force application reference axis vibration (e.g., pitch vibration) based on the information indicative of vehicle status at operation 620, determining a cancellation signal for provision to the torque control module based on the force application reference axis vibration at operation 630, and performing torque modulation with respect to the drive torque based on the cancellation signal to cancel the force application reference axis vibration at operation 640.

A vehicle control system for a vehicle may also be provided. The system may include an electric motor to generate a drive torque for propulsion of the vehicle, a sensor network operably coupled to suspension or propulsion system components of the vehicle to determine information indicative of vehicle status, a torque control module configured to generate the drive torque based at least in part on information indicative of operational intent, and a controller operably coupled to the sensor network to determine force application reference axis vibration (e.g., pitch vibration, roll vibration, yaw vibration, axial vibration, or combinations thereof) based on the information indicative of vehicle status to generate a cancellation signal for provision to the torque control module. The torque control module torque may modulate the drive torque based on the cancellation signal to cancel the force application reference axis pitch vibration.

The system of some embodiments may include additional features, modifications, augmentations and/or the like to achieve further objectives or enhance performance of the system. The additional features, modifications, augmentations and/or the like may be added in any combination with each other. Below is a list of various additional features, modifications, and augmentations that can each be added individually or in any combination with each other. For example, the torque control module may generate the drive torque by applying an overlay cancellation torque associated with the cancellation signal to a nominal drive torque determined based on the information indicative of operational intent. In an example embodiment, the electric motor may be mounted between an axle to which drive wheels of the vehicle are operably coupled and a chassis of the vehicle. In some cases, the electric motor may be mounted at a drive wheel of the vehicle or may otherwise be mounted apart from an axle shaft of the vehicle (e.g., connected to the shaft via a differential or other gear set). In an example embodiment, the force application reference axis vibration is calculated by the controller based on relative position changes between a housing of the electric motor and the axle or otherwise back calculated from torque values determined by the torque control module. In some cases, the force application reference axis vibration may be determined based on observed vibrations measured by sensors of the sensor network located proximate to attachment points between suspension components and a chassis of the vehicle. Alternatively or additionally, the force application reference axis vibration may be determined based on observed vibrations measured by sensors of the sensor network measuring passenger support platform track vibration. Alternatively or additionally, the force application reference axis vibration may be determined based on observed changes in ride height sensor input or displacement along shock absorption components. Alternatively or additionally, the force application reference axis vibration is determined based on yaw sensor input, inertial measurement unit input, or roll stability sensor input.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed:

1. A vehicle control system for a vehicle, the system comprising:
an electric motor to generate a drive torque for propulsion of the vehicle;
a sensor network operably coupled to suspension or propulsion system components of the vehicle to determine information indicative of vehicle status;
a torque control module configured to generate the drive torque based at least in part on information indicative of operational intent; and
a controller operably coupled to the sensor network to determine force application reference axis vibration based on the information indicative of vehicle status to generate a cancellation signal for provision to the torque control module,
wherein the torque control module torque modulates the drive torque based on the cancellation signal to cancel the force application reference axis vibration.

2. The system of claim 1, wherein the torque control module generates the drive torque by applying an overlay cancellation torque associated with the cancellation signal to a nominal drive torque determined based on the information indicative of operational intent.

3. The system of claim 1, wherein the electric motor is mounted between an axle to which drive wheels of the vehicle are operably coupled and a chassis of the vehicle.

4. The system of claim 1, wherein the electric motor is mounted at a drive wheel of the vehicle.

5. The system of claim 1, wherein the electric motor is mounted apart from an axle shaft of the vehicle.

6. The system of claim 1, wherein the pitch vibration is calculated by the controller based on relative position changes between a housing of the electric motor and the axle.

7. The system of claim 1, wherein the force application reference axis vibration is determined based on observed vibrations measured by sensors of the sensor network located proximate to attachment points between suspension components and a chassis of the vehicle.

8. The system of claim 1, wherein the force application reference axis vibration is determined based on observed vibrations measured by sensors of the sensor network measuring passenger support platform track vibration.

9. The system of claim 1, wherein the force application reference axis vibration is determined based on observed changes in ride height sensor input or displacement along shock absorption components.

10. The system of claim 1, wherein the force application reference axis vibration is determined based on yaw sensor input, inertial measurement unit input, or roll stability sensor input.

11. A method of employing motor control to reduce vibration felt by an operator of a vehicle with an electric motor for generating drive torque for propulsion of the vehicle, the method comprising:
 receiving information indicative of vehicle status from a sensor network operably coupled to suspension or propulsion system components of the vehicle;
 receiving information indicative of operational intent from the operator;
 determining force application reference axis vibration based on the information indicative of vehicle status;
 determining a cancellation signal for provision to the torque control module based on the force application reference axis vibration; and
 performing torque modulation with respect to the drive torque based on the cancellation signal to cancel the force application reference axis vibration.

12. The method of claim 11, the drive torque is torque modulated by applying an overlay cancellation torque associated with the cancellation signal to a nominal drive torque determined based on the information indicative of operational intent.

13. The method of claim 11, wherein the electric motor is mounted between an axle to which drive wheels of the vehicle are operably coupled and a chassis of the vehicle such that the electric motor is part of the suspension system of the vehicle.

14. The method of claim 11, wherein the electric motor is mounted at a drive wheel of the vehicle.

15. The method of claim 11, wherein the electric motor is mounted apart from an axle shaft of the vehicle.

16. The method of claim 11, wherein the force application reference axis vibration is calculated based on relative position changes between a housing of the electric motor and the axle.

17. The method of claim 11, wherein the force application reference axis vibration is determined based on observed vibrations measured by sensors of the sensor network located proximate to attachment points between suspension components and a chassis of the vehicle.

18. The method of claim 11, wherein the force application reference axis vibration is determined based on observed vibrations measured by sensors of the sensor network measuring passenger support platform track vibration.

19. The method of claim 11, wherein the force application reference axis vibration is determined based on observed changes in ride height sensor input or displacement along shock absorption components.

20. The method of claim 11, wherein the force application reference axis vibration is determined based on yaw sensor input, inertial measurement unit input, or roll stability sensor input.

* * * * *